(12) United States Patent
Suzuki

(10) Patent No.: US 6,434,454 B1
(45) Date of Patent: Aug. 13, 2002

(54) TESTING SYSTEM AND METHOD FOR AUTOMOTIVE COMPONENT USING DYNAMOMETER

(75) Inventor: Masahiko Suzuki, Shizuoka (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 10/040,431

(22) Filed: Jan. 9, 2002

(30) Foreign Application Priority Data

Jan. 11, 2001 (JP) ........................................ 2001-003376

(51) Int. Cl.$^7$ ............................................. G01M 17/00
(52) U.S. Cl. .............................. 701/29; 701/35; 701/36; 73/862
(58) Field of Search .............................. 701/29, 35, 32, 701/36, 37, 51, 53, 54, 67, 83, 84, 87, 93; 73/862, 862.041, 862.08, 862.381

(56) References Cited

U.S. PATENT DOCUMENTS

| | | | |
|---|---|---|---|
| 3,763,699 A | * 10/1973 | Sangster | ...................... 73/117 |
| 4,669,318 A | 6/1987 | Ångström | ................ 73/862.09 |
| 5,954,783 A | 9/1999 | Yamaguchi et al. | ........ 701/106 |

FOREIGN PATENT DOCUMENTS

| | | |
|---|---|---|
| GB | 645639 | 11/1950 |
| JP | 2000-39380 | 2/2000 |
| JP | 2000-39381 | 2/2000 |
| JP | 2000-105172 | 4/2000 |
| JP | 2000-269738 | 9/2000 |

* cited by examiner

*Primary Examiner*—Richard M. Camby
(74) *Attorney, Agent, or Firm*—Foley & Lardner

(57) ABSTRACT

In testing system and method for an automotive vehicular component such as an engine, a system monitor section sets required items including a vehicular specification and a running resistance of the vehicle and outputs the set required items to a measurement controlling section, a model generating section is provided in which a simulation model including a vehicular vertical vibration model constituted by a vehicular suspension spring and a tire spring and a spring model of an inertia system is set, a vehicular model execution controlling section executes a vehicular model simulation for the vehicular component to be tested by introducing at least an acceleration signal and a clutch signal from the measurement controlling section and the simulation model from the model generating section and outputs control signals to the inverter and the electronic control section so as to control the vehicular component to be tested.

8 Claims, 9 Drawing Sheets

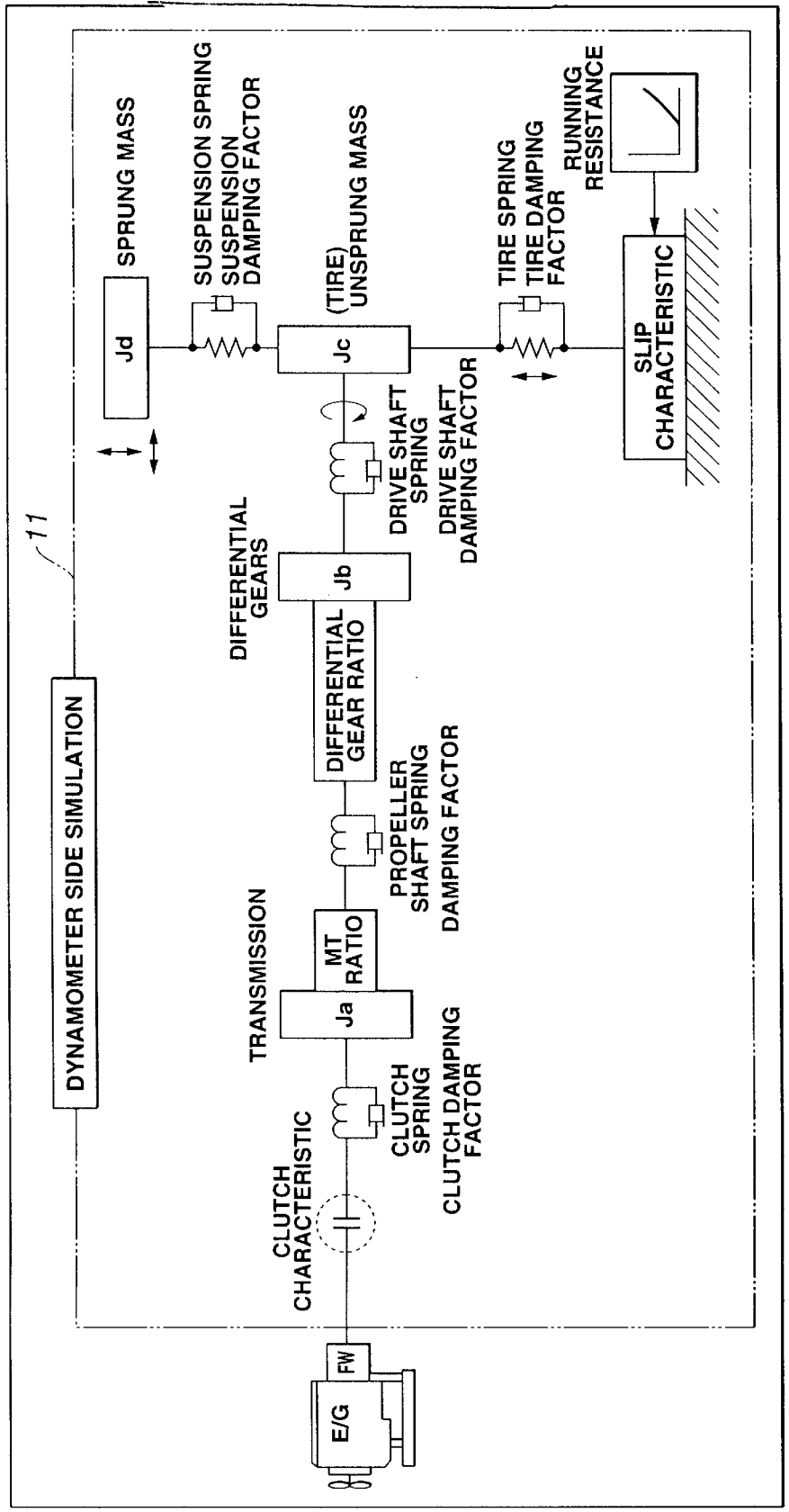

A CASE OF AUTOMATIC TRANSMISSION

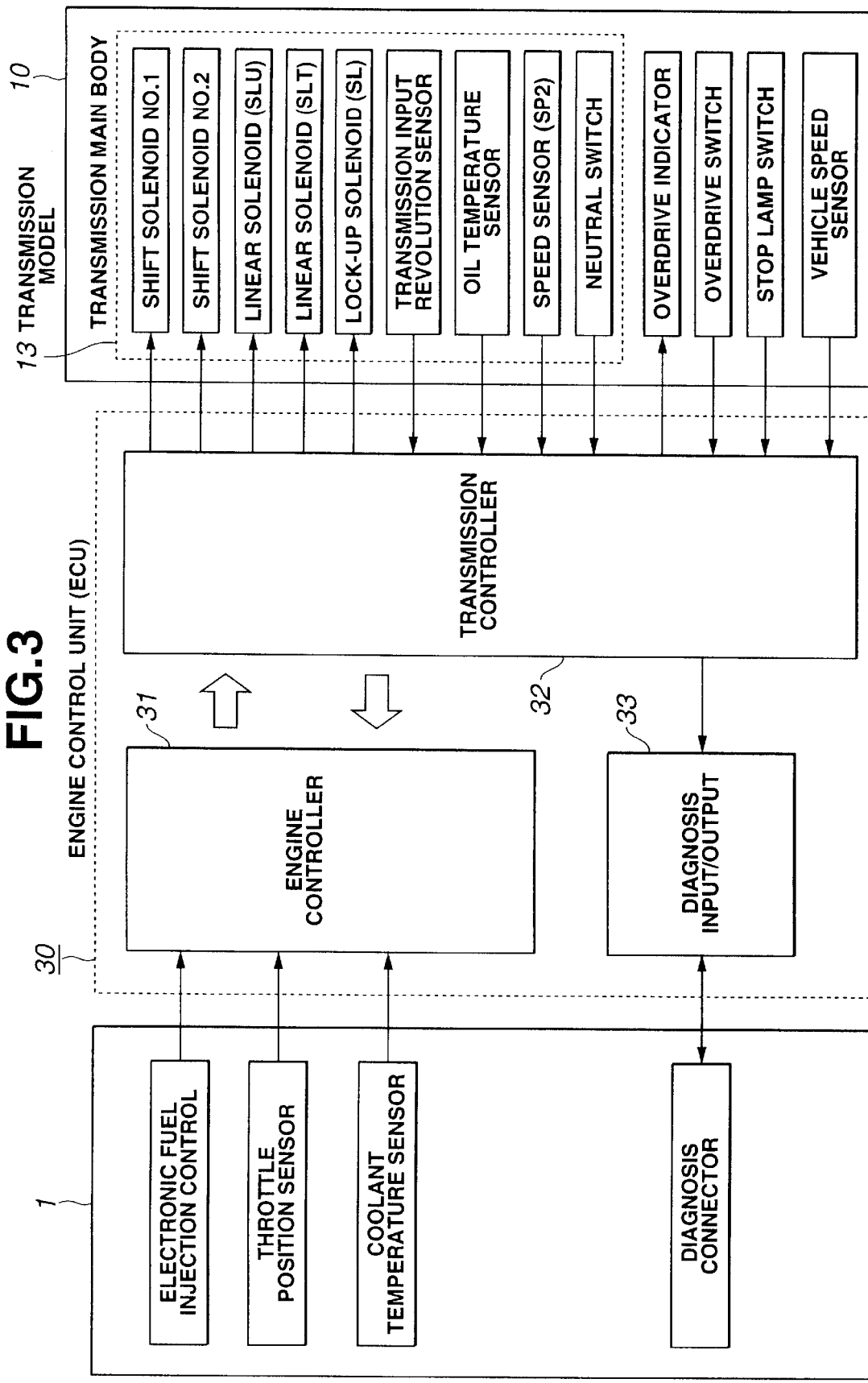

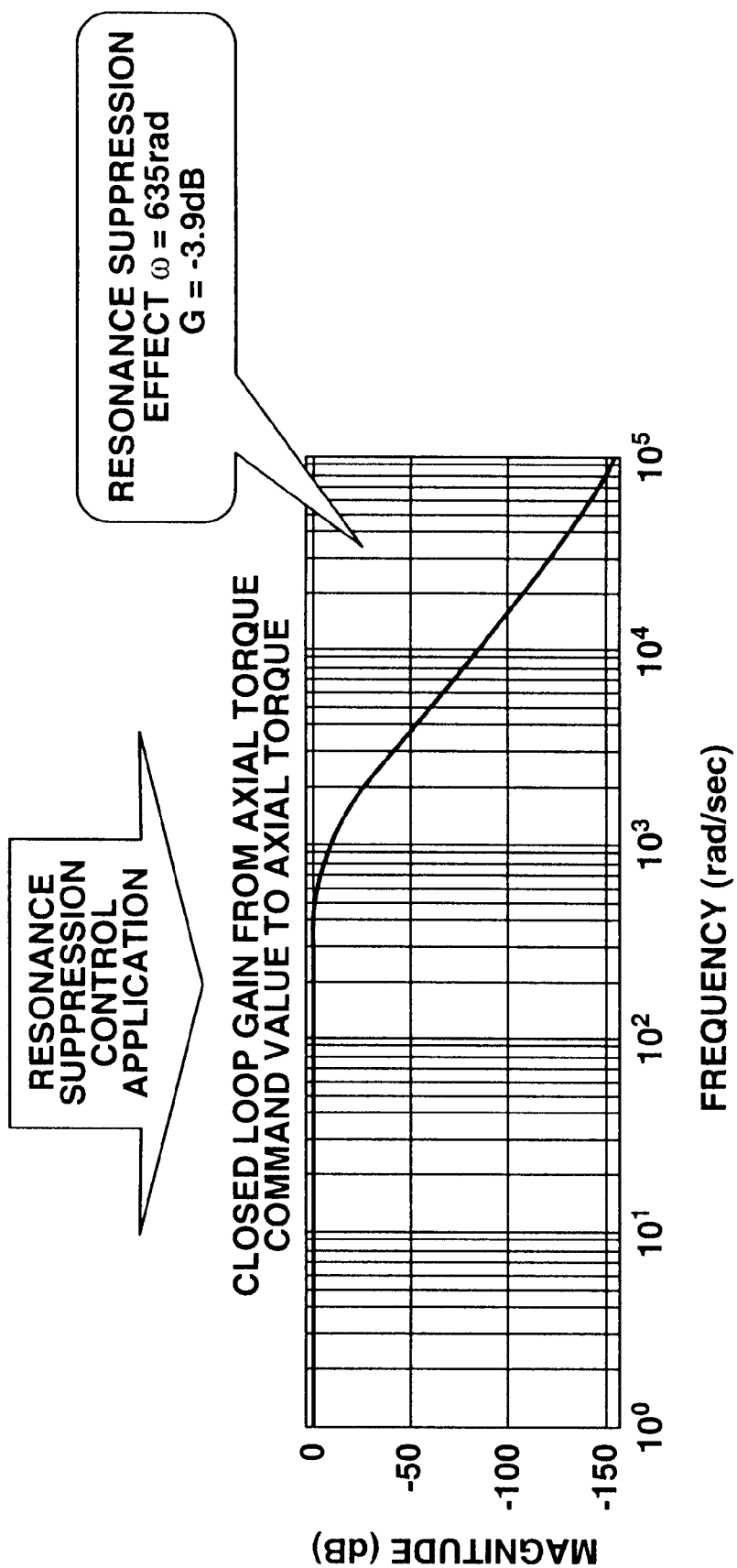

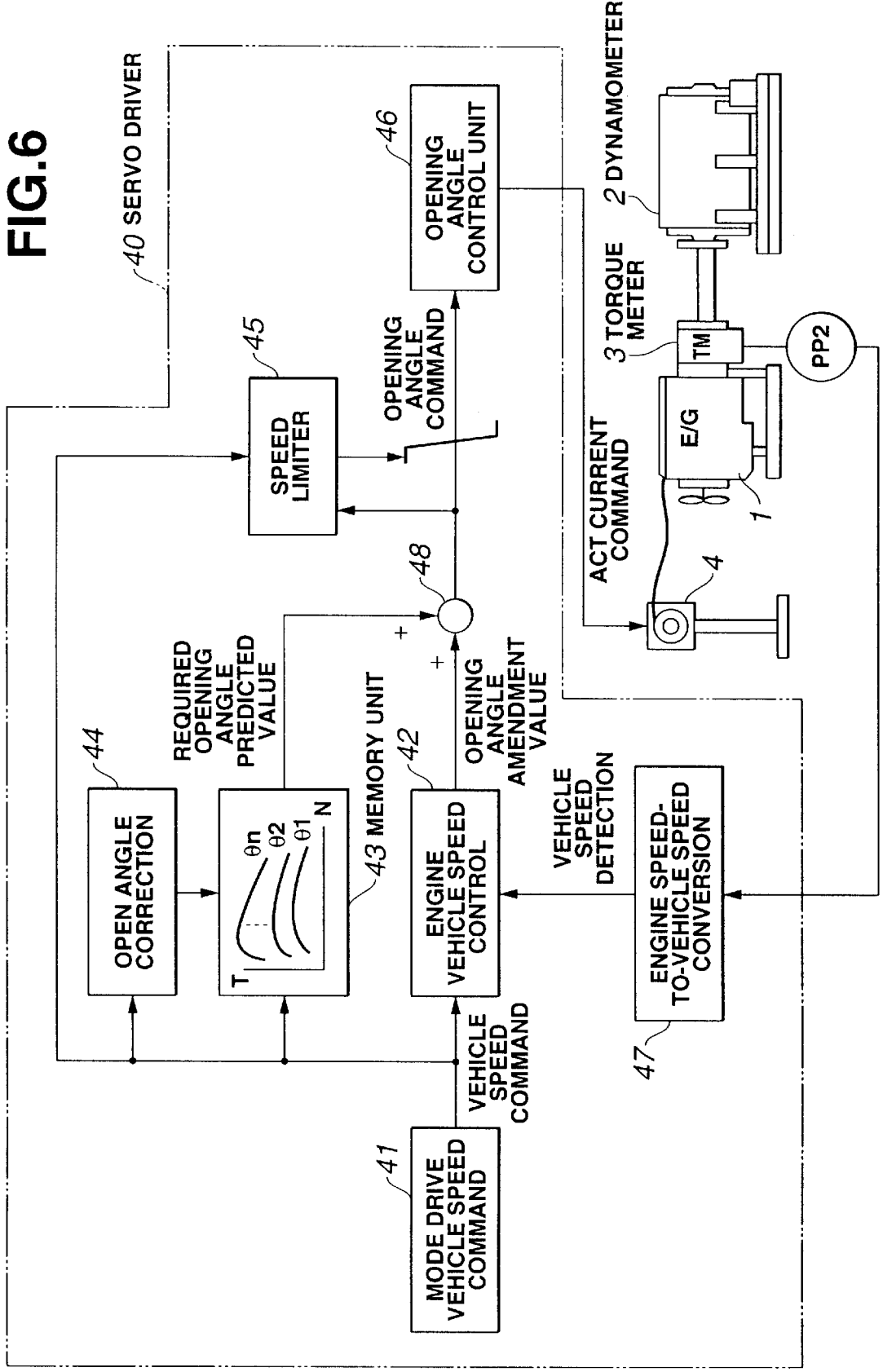

TESTING SYSTEM AND METHOD FOR AUTOMOTIVE COMPONENT USING DYNAMOMETER

BACKGROUND OF THE INVENTION

1. Field of the Invention

The present invention relates to testing system and method for an automotive component such as an engine with a dynamometer.

2. Description of the related art

Various types of vehicular component testing systems have been proposed to test a performance of the vehicular component. The vehicular component includes an engine, a transmission, a differential gear, and so forth. Such a previously proposed testing system as described above is an engine bench test constituted by an engine bench test constituted by a combination of an engine drive system and a dynamometer absorption system and a power train bench test constituted by a dynamometer drive system and a dynamometer (energy) absorption system On the other hand, on the side of the dynamometer DY, there are disposed a rotation detector PP and a torque detector (e.g., a load cell) LC, so that the controls of vehicle speed and output torque are executed on the basis of the detected signals of these individual detectors.

Such a testing system as described above has another previously proposed engine bench test in which the above-described transmission is omitted and, in place of the transmission, a torque meter (or torque sensor) is incorporated on an output shaft of the engine.

SUMMARY OF THE INVENTION

Using the above-described testing system, there have been executed the test of a durability of the engine, the performance tests on a fuel economy or exhaust gas emission measurements, and the test of a conformance to the ECU (Electronic Control Unit). In order to achieve test results obtained as if the vehicle in which the vehicular component (s) is mounted were running on a road, the testing is implemented by applying a running resistance to the vehicle component to be tested from the dynamometer in a pseudo form. Since, however, the testing drive does not meet with an actual environment when the components to be tested are actually mounted on the vehicle and this vehicle is running on an actual road, a transient fuel economy evaluation in a statutory mode drive, a measurement result evaluation of exhaust gas emission, a driveability of the engine or the vehicle have been mode through a chassis dynamometer, an actual vehicular run. Therefore, in the previously proposed vehicular component testing systems described above have the following inconveniences.

(1) The transient performance test of the engine or the vehicle-related components cannot be executed without using a complete vehicle.

(2) The dynamometer DY and the engine E/G are interconnected through the rotary shaft. Because of a low mechanical resonance point in this system, however, a highly responsive torque wave form cannot be transmitted from the dynamometer DY to the engine E/G, and the highly responsive behavior on the engine side cannot be transmitted to the dynamometer.

(3) In any previously proposed engine control, a performance is so low that the fuel economy and exhaust gas emission data cannot be reproduced like those at the time when the complete vehicle is driven by a driver.

(4) For reproducing the transient state, it is necessary to make the dynamometer highly responsive. However, a response characteristic cannot be improved because a long delay is in the transfer time of the signals between the controller and a control board of the dynamometer.

It is, therefore, an object of the present invention is to provide testing system and method for a vehicular component which can solve at least one or each of the above-described items on inconveniences of (1) to (4).

According to one aspect of the present invention, there is provided a testing system for an automotive vehicular component, comprising: a dynamometer linked to the vehicular component to be tested via a torque meter and a rotary shaft, the dynamometer being controlled by means of an inverter; a servo driver; an electronic controlling section, the vehicular component to be tested being controlled by outputs of the servo driver and electronic controlling section; a system monitor section that monitors and sets required items including a vehicular specification and a running resistance of the vehicle and outputs required items including the vehicular specification and the running resistance to a measurement controlling section; a model generating section connected to the system monitor section via a transmission path and in which a simulation model including a vehicular vertical vibration model constituted by a vehicular suspension spring and a tire spring and a spring model of an inertia system is set; and a vehicular model execution controlling section that executes a vehicular model simulation for the vehicular component to be tested by introducing at least an acceleration signal and a clutch signal from the measurement controlling section and the simulation model from the model generating section and outputs control signals to the inverter and the electronic control section so as to control the vehicular component to be tested.

According to another aspect of the present invention, there is provided a testing method for an automotive vehicular component, comprising: providing a dynamometer linked to the vehicular component to be tested via a torque meter and a rotary shaft, the dynamometer being controlled by means of an inverter; providing a servo driver; providing an electronic controlling section, the vehicular component to be tested being controlled by outputs of the servo driver and electronic controlling section; setting required items including a vehicular specification and a running resistance of the vehicle, monitoring with a system monitor; outputting required items including the vehicular specification and the running resistance to a measurement controlling section; providing a model generating section connected to the system monitor section via a transmission path and in which a simulation model including a vehicular vertical vibration model constituted by a vehicular suspension spring and a tire spring and a spring model of an inertia system is set; executing a vehicular model simulation for the vehicular component to be tested by introducing at least an acceleration signal and a clutch signal from the measurement controlling section and the simulation model from the model generating section; and outputting control signals to the inverter and the electronic control section so as to control the vehicular component to be tested.

This summary of the invention does not necessarily describe all necessary features so that the invention may also be a sub-combination of these described features.

BRIEF DESCRIPTION OF THE DRAWINGS

FIGS. 2A and 2B are simulation model views of a vehicular manual transmission and of an automatic transmission which are installed in a model unit shown in FIG. 1.

FIG. 3 is a schematic construction diagram representing signal transfers in an electronic control unit of an engine to be tested in the testing system shown in FIG. 1.

FIGS. 5A and 5B are Bode diagrams each representing a gain characteristic modeled as a first torsional vibration system of the torque transmission system based on FIG. 4A.

FIG. 6 is a construction diagram of a servo driver in the testing system shown in FIG. 1.

DETAILED DESCRIPTION OF THE EXEMPLARY EMBODIMENT

Reference will hereinafter be made to the drawings in order to facilitate a better understanding of the present invention.

Figure 1:
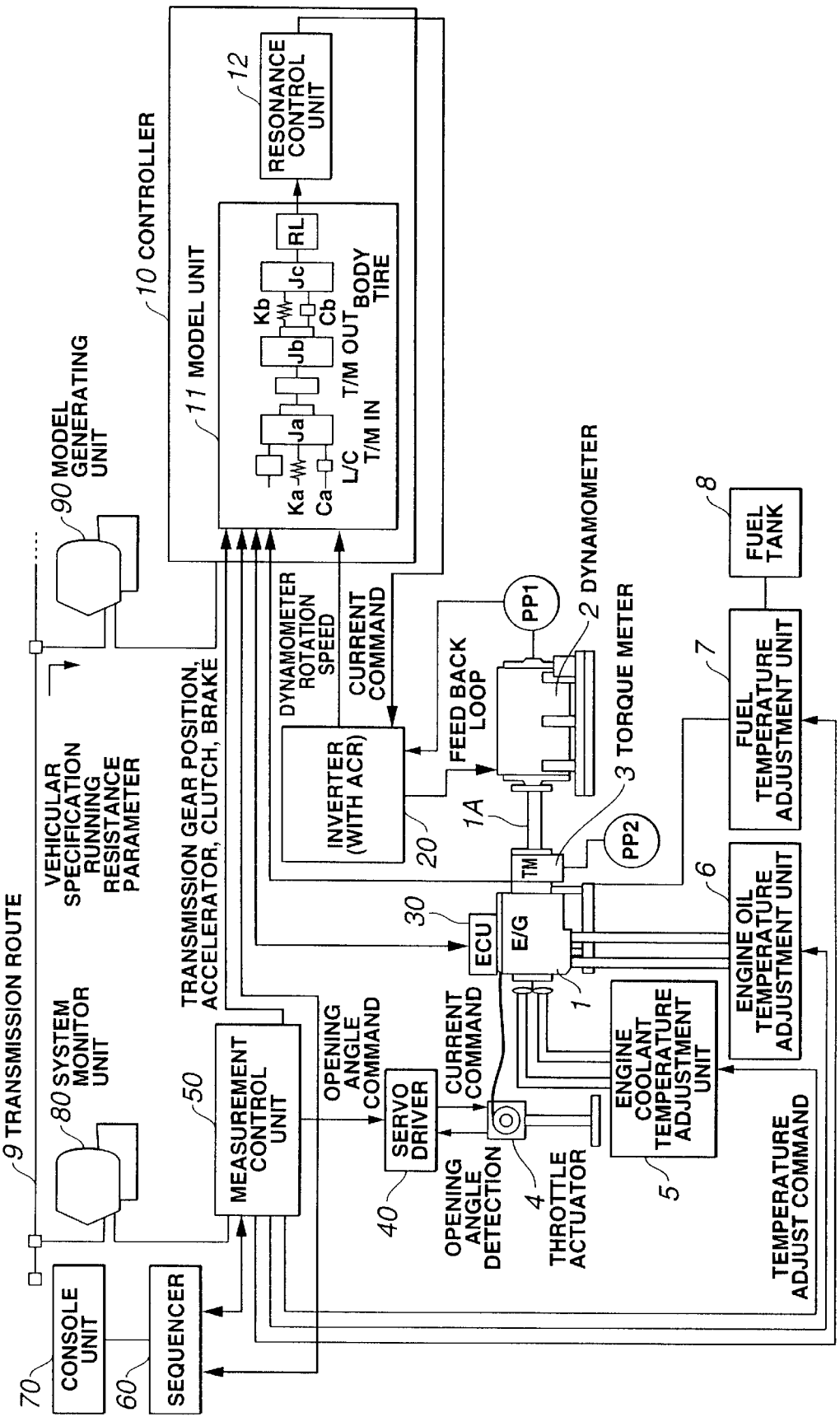
FIG. 1 is a schematic construction diagram of a vehicular component testing system in an exemplary embodiment according to the present invention.

FIG. 1 shows a schematic block diagram of a testing system of a vehicular component in a preferred embodiment according to the present invention. Reference numeral 1 designates an engine, and reference numeral 2 designates a dynamometer, which is so connected through a rotary shaft 1A to the engine 1 that a torque to be generated therein can be transmitted to the engine 1. Numeral 3 designates a torque meter for detecting a torque transmitted to the engine 1 from the dynamometer 2 and outputting the detected torque value to a (execution) controller 10 of a vehicle model unit 7. The torque meter is exemplified by a British Patent No. 645,639 (, the disclosure of which is herein incorporated by reference). In the (execution) controller 10, a current command value to control the dynamometer 2 is generated and supplied to an inverter 20. This inverter 20 is set with a speed signal by a speed signal setting device (although not shown) and a revolution signal (in RPM) of the dynamometer 2, as detected by a rotation detector PP1, is fed back to that speed signal setting device, so that the inverter 20 controls a speed and/or torque of the dynamometer 2 on the basis of these individual signals.

Numeral 4 designates a throttle actuator, by which a throttle opening angle is controlled to adjust an intake air flow to be supplied to a combustion chamber of the engine 1 and by which the throttle opening angle is detected and fed back to a servo driver 40. Numeral 30 designates an electronic control unit (ECU) for controlling the engine, to which a control command is inputted from the execution controller 10 of the vehicle model. Numeral 50 designates a measurement control unit which is constituted by a computer for outputting a transmission (T/M) gear range position, and an accelerator, clutch, and brake signals to the (execution) controller 10 of the vehicle model unit 11. Moreover, this measurement control unit 50 performs signal transmission and receipt from and to a sequencer 60 and outputs a cooling water temperature adjusting signal to an engine cooling water (coolant) adjustment unit 5, an oil temperature adjusting signal to an engine oil temperature adjustment unit 6, and a fuel temperature adjustment signal to a fuel temperature adjustment unit 7.

Numeral 70 designates a console for controlling accelerator and clutch positions and so on externally from an outside. Numeral 80 designates a computer acting as a system monitor unit to measure/monitor, to set an automatic drive scheduler and vehicle specifications (e.g., T/M parameters), to set a running resistance, to collect/set engine maps, to process data, and so on. Numeral 90 designates a model generating unit constituted by a computer for generating the vehicle model on the basis of individual constants by introducing running resistance parameters sent via a transmission route 9.

With reference to the block diagram of FIG. 1, the aforementioned items of conveniences (1) to (4) are solved, as will be specifically described in the following.

EXAMPLE 1

In a case where a vehicular component to be tested is the (internal combustion) engine 1, as shown in FIG. 1, the engine 1 is placed on a bench, and this engine 1 is connected directly to the dynamometer 2 through the torque meter (TM) 3 and the rotary shaft 1A. In order to execute a simulation precisely, the torque meter 3 is arranged in such a way that it can directly measure the output torque at the output portion (shaft) of the engine 1. For the output revolution of the engine in RPM, moreover, an revolution detector PP2 is arranged at the same position as that of the torque meter 1 of the engine output portion.

Figure 8:
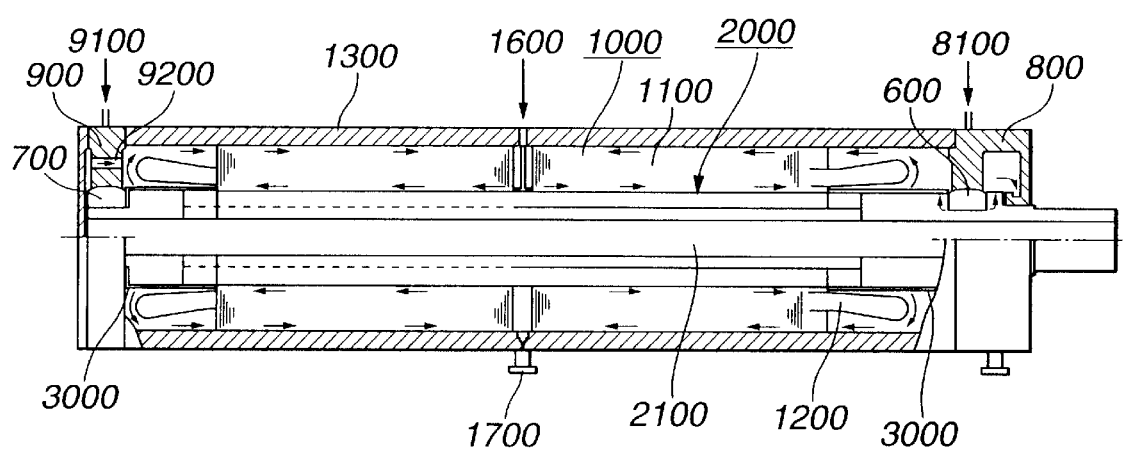
FIG. 8 is a schematic cross sectional view of an example of a dynamometer shown in FIG. 1.

Thus, the testing system is constructed to include the engine 1 (containing a flywheel FW), the torque meter 3,the rotary shaft 1A and the dynamo meter 2. In this system, the torque meter 3, the rotary shaft 1A and the dynamometer 2 subsequently connected to the engine 1 are, desirably, low inertia system components whose inertia is as low as possible. For this low inertia, a diameter of a rotor of the dynamometer 2 is, desirably, extremely made small. For example, inertial value (in $Kgm^2$) was improved from about 1.3 of the conventional system components to about 0.1 when the dynamometer 2, for example, disclosed in a Japanese Patent Application No. 2000-269738 filed in Japan on Sep. 6, 2000 was used as the dynamometer 2 shown in FIG. 1, an IM (Induction Motor) motor was exchanged to a PM (Poly-phase Motor) motor to improve an efficiency, and the cooling method was changed from an air to water cooling. FIG. 8 shows the structure of the dynamometer (D/M) 2 disclosed in the Japanese Patent Application No. 2000-269738. The dynamometer shown in FIG. 8 includes: the rotor 2000 supported on bearings 600 and 700; a stator 1000 disposed at a position opposing to the rotor; a cooling liquid opening 1600 penetrated through a frame 1300 of the dynamometer and the stator for causing a cooling liquid flow into a space between the rotor and the stator; and can 3000 interposed between a winding 1200 of the stator and the rotor for preventing a direct contact of an agitating cooling liquid due to a revolution of the rotor on the winding 1200 and an iron core 1100 of the stator, a plurality of cooling liquid openings (9200, 1000) being provided on the can which is near to a bracket 900 or 800.

Moreover, an inertial value was improved from about 0.5 to about 0.2 ($Kgm^2$) by replacing a material from a steel to glass fibers and was improved from about 0.65 ($Kgm^2$) to about 0.3 ($Kgm^2$) by replacing the torque meter TM 3 into that of a coupling type.

Therefore, a total inertial value according to the above-described three replacements due mainly to the light weight was improved to indicate about 0.42 Kgm$^2$ (although a comparative example without the above-described replacements indicated about 2.45 Kgm$^2$).

Furthermore, by achieving a highly responsive controllability for the dynamometer 2, the simulation could be made so highly precise as close (approximated) to that of an actual vehicle without applying a severe shock which would occur during a control delay time to the component to be tested such as the engine.

Figure 2B:
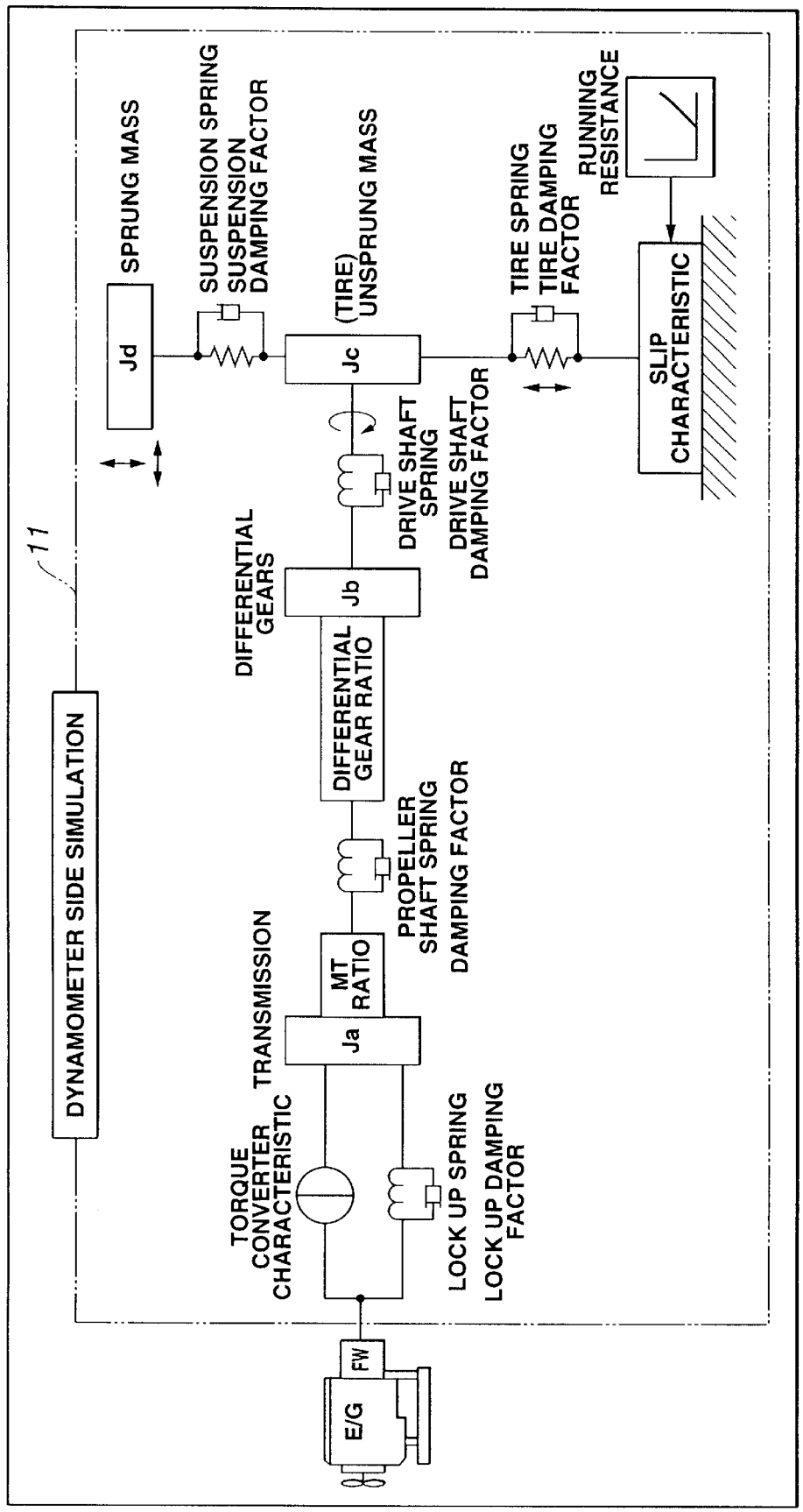

FIGS. 2A and 2B show generated models for the components except the engine to be tested for a simulation. Specifically, FIG. 2A shows the model of a case of a manual transmission MT and FIG. 2B shows the case of an automatic transmission AT. The portions, as indicated by dot-dot-and-dash lines in FIGS. 2A and 2B, correspond to model unit 11 shown in FIG. 1.

Each of the simulation models (in the model unit 11) shown in FIGS. 2A and 2B is constituted by a spring model of a 4-inertia system, a suspension, and vertical vibrations (i.e., sprung (vehicle body) - unsprung mass (tire wheels) vibrations) by tire springs.

Individual values of coefficients of the components shown in FIG. 2A and 2B are inputted to the model unit 11 shown in FIG. 1 as model parameters from the model generating unit 90 shown in FIG. 1. Then, the model parameter inputted model shown in FIGS. 2A or 2B and are transmitted through a transmission route to the execution controller 10 of the vehicle model system. The execution controller 10 executes a simulation using the model whose parameters are inputted therein. It is noted that, although the model structure of a previously proposed testing system (which is a comparative example to the testing system in the embodiment shown in FIG. 1) is fixed (one model with only the fixed model parameters), the testing system in the embodiment according to the present invention has such a feature that, in the testing system including the model generating unit 90 and the system monitor unit 80 shown in FIG. 1, the simulation structure itself can be modified by a simulation tool utilizing a GUI (Graphical User Interface). By means of the model generating unit 90 and the system monitor unit 80, therefore, not only the parameters but also the model structure itself can be changed so that every type of vehicular components can be simulated.

A vehicle model, which is generated through the GUI, is down-loaded so as to enable an execution in the execution controller 10. Various commands are issued from the controller 10 to the electronic control unit 30 of the engine E/G 1 shown in FIG. 1.

FIG. 3 shows a signal transfer state in the electronic control unit 30 with the engine 1 and controller 10 in which the model is installed in the down-load form as the automatic transmission 13. In a case of FIG. 3, it is necessary to transmit and receive required signals among the electronic control unit 30, the engine E/G 1, and the execution controller 10 to implement a vehicular simulation. For this purpose, the electronic control unit 30, as shown in FIG. 3, includes an engine controller 31, a transmission controller 32, a diagnosis input/output unit 33, and so on. The engine controller 31 receives the various signals from an electric fuel injection control (for the fuel electronic injection quantity and start timing control), a throttle position sensor for detecting an opening angle of an engine throttle valve and a water (coolant) temperature sensor in the engine 1 and transmits and receives signals to and from the transmission controller 32. In addition, this transmission controller 32 outputs related commands to shift solenoids No. 1 and No. 2, linear solenoids No. 1 and No. 2 and a lock-up solenoid of model 13 of a transmission body modeled in the execution controller 10, and receives individual signals of a transmission (T/M) input revolution sensor, an oil temperature sensor, a speed sensor (SP2) and a neutral sensor from the model 13 of the transmission body. In addition, the transmission controller 32 receives the individual signals from an overdrive switch, a stop lamp switch and a vehicle speed sensor from the execution controller 10 and outputs a model signal to an overdrive indicator.

The signals of the individual controllers 31 and 32 are transferred through the diagnosis input/output unit 33 with signals of a diagnosis connector so that the abnormality-related signals of the engine are simulated.

With the testing system construction thus described above with reference to FIGS. 1 through 3, the transient performance tests of the engine can be executed without using a completed vehicle.

EXAMPLE 2

In the second example, in order to solve the foregoing item on inconveniences (2), a highly responsive torque waveform is transmitted from the dynamometer 2 to the engine 1.

Figure 4A:
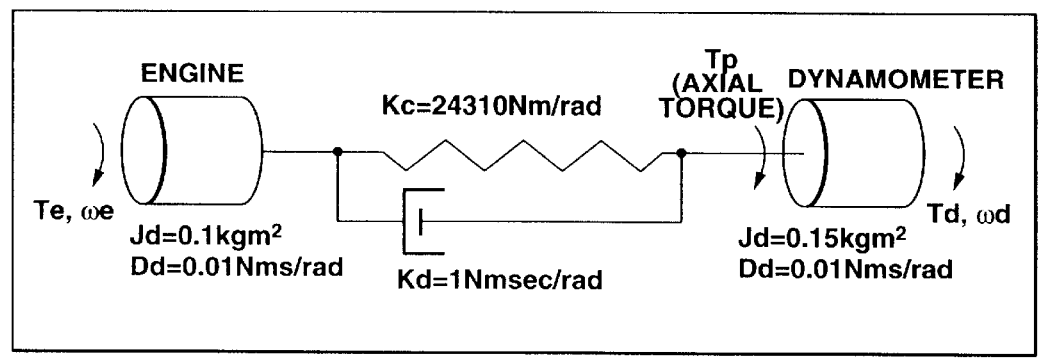
FIGS. 4A and 4B are a model view of a vehicular torque transmission system dynamic characteristic in the testing system shown in FIG. 1 and a construction block diagram representing a transfer function to suppress a vibration at a modeled portion in a model unit shown in FIG. 1.
Figure 4B:
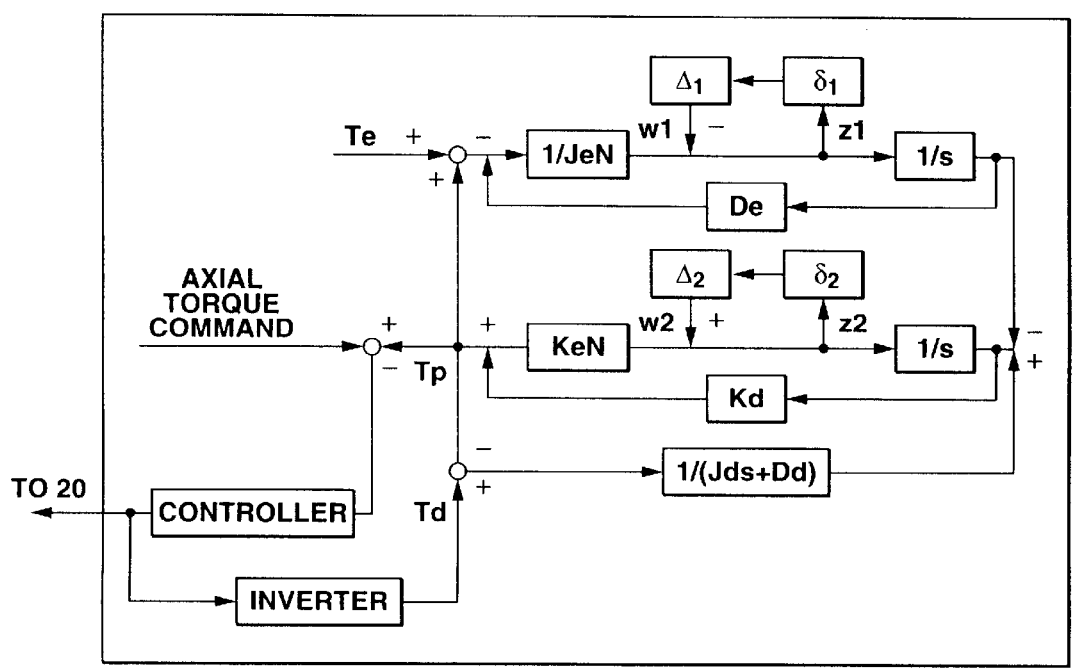

FIGS. 4A and 4B show an internal model on the vibration suppression (resonance) control unit 12 shown in FIG. 1. Especially, FIG. 4A shows a model for a dynamic characteristic of a torque transmission system, and FIG. 4B shows a functional block diagram of a transfer function for damping the vibrations at a modeled portion (model unit 11). This modeled portion shown in FIG. 4B is the rotary shaft 1A connecting the engine 1 and the dynamometer 2 shown in FIG. 1, and the symbols shown in FIGS. 4A and 4B have the following meanings. That is to say, in FIGS. 4A and 4B, a symbol Te denotes an engine torque; a symbol ωe denotes the engine speed in RPM; a symbol Je denotes an inertial moment of the engine 1; a symbol De denotes a viscous friction coefficient of the engine 1; a symbol Kc denotes a spring constant of the rotary shaft 1A interposed between the dynamometer 2 and the engine 1; a symbol Kd denotes a viscous friction coefficient of the rotary shaft1A; a symbol Tp denotes a shaft (axial) torque; a symbol Jd denotes an inertial moment of the dynamometer 2; a symbol Dd denotes a viscous friction coefficient of the dynamometer 2; a symbol Td denotes a torque of the dynamometer 2; and a symbol ωd denotes an RPM (revolution speed) of the dynamometer 2. In addition, 1/s denotes an integrator. Other symbols denote constant values. Herein, a resonance signal of resonance control unit 12 is outputted as a current command to the inverter 20.

In the engine bench of the testing system in the comparative example to the exemplary embodiment shown in FIG. 1, the transmission or clutch is used to make a coupling of engine 1 to the dynamometer 2 so that a mechanical resonance point of the system has been low. In the engine bench, moreover, the drive speed in RPM range is from an engine idling speed of the vehicle up to about 8,000 rpm. If the resonance has its point within that range, it may invite a mechanical breakage of the testing system. Therefore, a resonance point is set at a lower RPM than the engine idling speed value (because the inertial value or a damping constant value makes it difficult to set the revolution speed value in RPM higher than 8,000 rpm).

On the other hand, a vibration of a drive system or a chassis vibration of a generally available vehicle has a frequency of 100 Hz or less (e.g., about 50 Hz). Therefore, a resonance point is set to about 10 to 20 Hz equal to or below the idling speed in RPM when it is set at the idling value, as described above. In the testing system in the embodiment according to the present invention, however, a resonance point of the system is set to such a value in the vicinity to 100 Hz that will not influence the control. This resonance point is subjected to a robust control through the resonance control unit 12 and the inverter 20, thereby to suppress the resonance so that a shaft torque control can be made flat and stable to 100 Hz or higher. Here, this setting range of the resonance point has a lower limit at the vibration frequency of the drive system of the automobile and an upper limit at a control frequency of the current control unit (ACR) of the inverter for controlling on the basis of a current command value. By the performance, therefore, there is determined a frequency in the vicinity of or over the resonance point of 100 Hz, for example.

On the other hand, the block diagram of FIG. 4B of a transfer function for the vibration suppression at the model portion is constructed, with consideration of the suppression performance of disturbances and the robustness against the system parameter fluctuation.

Figure 5A:
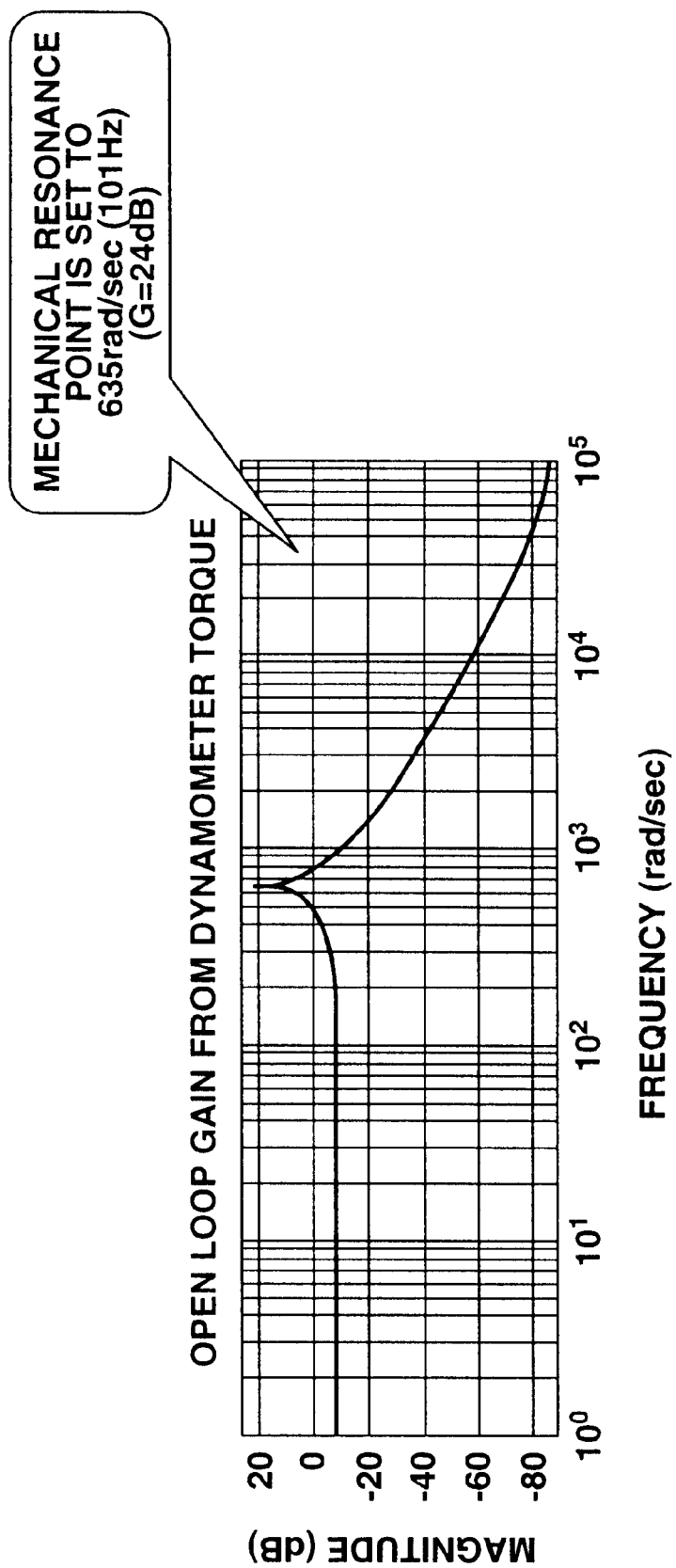

FIGS. 5A and 5B are Bode diagrams illustrating the gain characteristics of the model, in which the torque transmission system based on FIG. 4A is modeled as a primary torsional vibration system. FIG. 5A presents a closed loop gain from the dynamometer torque to the shaft torque of the case without the suppression control. When the mechanical resonance point was set at 635 rad/sec (corresponding to 101 Hz), the gain (G) was 24 dB. On the contrary, the closed loop gain from the shaft torque command value to the shaft torque of the case in which the resonance suppression control is executed by the block of FIG. 4B was a gain G of −3.9 dB for resonance point of 635 rad/sec, as illustrated in FIG. 5B. As apparent from FIG. 5B, the resonance point is suppressed so that the drive can be done without deteriorating a transmission characteristics to 100 Hz or higher.

EXAMPLE 3

This example contemplates to reproduce the fuel economy and exhaust gas emission data which are similar to those when the driver drives the actual vehicle.

FIG. 6 shows a construction of the servo driver 40 shown in FIG. 1. Reference numeral 41 designates a mode drive vehicle speed command unit. A vehicle speed command from this command unit 41 is outputted to an engine/vehicle speed control 42, an engine characteristic memory unit 43, an opening correction unit 44, and a speed limiter unit 45. The engine/ vehicle speed control unit 42 is operated on the basis of the input vehicle speed command and a vehicle speed detected signal fed back by an engine-speed/vehicle-speed conversion unit 47, and outputs the deviation signal as an opening correction value. The opening correction unit 44 has a function to make a learning drive in advance on the actual driving mode, and is, for example, constituted by a CMAC (Cerebellar Model Arithmetic Computer) operational amplifier which is exemplified by a U.S. Pat. No. 5,954,783 (, the disclosure of which is herein incorporated by reference), the table values of which are so adjusted that an output value and an output target value for an input value may be equalized by using the former as a learning value and the latter as a teaching value. From this opening correction unit 44, the opening correction value corresponding to the vehicle speed command is outputted to the engine characteristic memory unit 43. This memory unit 43 is stored with the characteristic values of the engine torque-versus-opening so that the predicted necessary opening value is selected from the stored characteristic values on the basis of the vehicle speed command and the opening correction value and is outputted to an adder 48. This adder 48 adds the opening correction value from the engine vehicle speed control unit 42 and the predicted necessary opening value in a common polarity, and outputs the sum to the speed limiter unit 45. This speed limiter unit 45 sets the limiter value of the opening stroke on the basis of the vehicle speed command and the added signal from the adder. This set limiter value is outputted as the opening command value to an opening control unit 46 of the actuator, and this control unit 46 outputs the limiter value as the current command value to the throttle actuator 4 so that the throttle opening is controlled. In accordance with this opening, therefore, the engine 1 is controlled which is detected by the rotation detector PP2 and fed back through the engine/vehicle-speed conversion unit 47 to the engine vehicle speed control unit 42.

The engine control has pursued the following performance to the vehicle speed or the command so that it has a remarkably quick response to the opening. However, the testing object such as the fuel economy measurement or the exhaust gas emission measurement has a tendency to become worse than that at the human-driven time. The causes for this tendency are considered to come from the following:

a. The opening stroke speed is higher than necessary;
b. The running mode is read in advance as by the driver so that the next operation cannot be prepared; and
c. The mode drive cannot be made unlike the man drive while knowing the characteristics of the engine.

According to the present invention, a speed limiter unit 45 is provided to cope with the above-described item a, so that a limit is provided against a differential value of the opening stroke as a countermeasure of the item a.

Against the item b, moreover, there is provided the opening correction unit 44, which is constructed to learn the drive in advance for the actual driving mode. Against the item c, still moreover, the engine characteristics are recorded in advance in the memory unit 43 so that they are selected and utilized in response to the opening command.

With this construction, it is possible to solve the aforementioned problem (3).

EXAMPLE 4

In this example, the highly responsive dynamometer 2 is achieved so as to realize a transient state again. In the testing system of this kind shown in FIG. 1, generally describing, the vehicle model execution controller 10 and the inverter 20 are disposed at a relatively long distant position, and the command is outputted as an analog signal from the controller to the control panel of the inverter. Considering the countermeasure against the noise, therefore, it is necessary to provide a filter of about 10 ms. In order to execute the resonance suppressing control at 100Hz, as describedhereinbefore, there is needed a control responsibility of about 2 ms. Considering allowances such as 500 $\mu$sec (microseconds) for the torque command operation in the inverter 20, 100 $\mu$sec for the resonance suppression value operation in the damping control unit 12 or 1 ms for the shaft torque detection, therefore, the delay time for transferring the signals between the execution controller 10 and the inverter 20 has to be 100 $\mu$sec or shorter.

Figure 7:
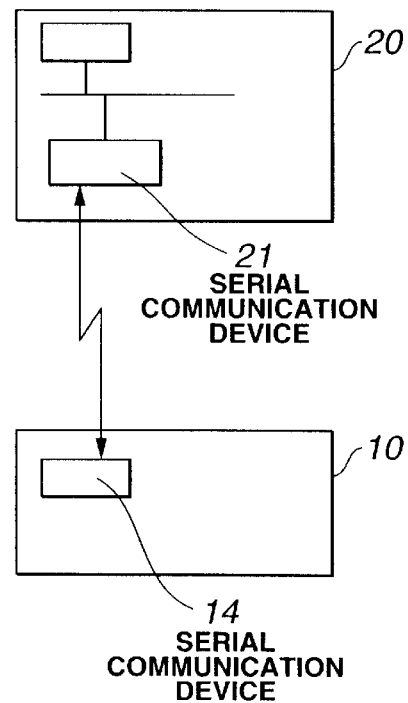
FIG. 7 is a construction diagram of a serial signal communication device interposed between the execution controller and an inverter.

FIG. 7 is a construction diagram for satisfying those needs. As shown in FIG. 7, the execution controller 10 and the inverter 20 are equipped with serial communication devices 14 and 21. These serial communication devices 14 and 21 are exemplified by a 16-channel multiplex transmission LSI, and the signal transfer between controller 10 and inverter 20 is executed at about 40 μsec at a clock time of 20 MHz thereby to raise the speed.

According to the present invention, as has been described hereinbefore, the testing for the vehicular component to be tested is executed on the basis of the model of the engine or any other vehicular component, as generated by the system monitor unit and in the model generating unit. Therefore, the tests of the engine or the vehicle-related component can actually be achieved not in combination with other components but singly as the vehicle. By utilizing the GUI, moreover, the model structure itself can be modified so that the simulations of all vehicular components for various types of vehicles can easily be executed.

Moreover, in a case where the engine is the vehicular component to be tested, the individual components can be so combined as to combine and test the transmission or the like by the simulation with various transmissions models such as the automatic transmission, the manual transmission or a continuously variable transmission (CVT), even if the actual transmission is not used.

Moreover, the resonance point of the resonance frequency of the testing system can be set at a high frequency value so that the vibrations to be generated in the actual vehicle can be reproduced on the engine bench. There can be obtained the effects: to perform the actual road running tests of the vehicle with the single engine; to perform the drivability tests on the engine bench as on the actual road; and to make the engine control indicating similar fuel economy / exhaust gas emission as by the driver.

The entire contents of Japanese Patent Applications No. 2001-3376( filed in Japan on Jan. 11, 2001) are herein incorporated by reference. The scope of the invention is defined with reference to the following claims.

What is claimed is:

1. A testing system for an automotive vehicular component, comprising:
   a dynamometer linked to the vehicular component to be tested via a torque meter and a rotary shaft, the dynamometer being controlled by means of an inverter;
   a servo driver;
   an electronic controlling section, the vehicular component to be tested being controlled by outputs of the servo driver and electronic controlling section;
   a system monitor section that monitors and sets required items including a vehicular specification and a running resistance of the vehicle and outputs required items including the vehicular specification and the running resistance to a measurement controlling section;
   a model generating section connected to the system monitor section via a transmission path and in which a simulation model including a vehicular vertical vibration model constituted by a vehicular suspension spring and a tire spring and a spring model of an inertia system is set; and
   a vehicular model execution controlling section that executes a vehicular model simulation for the vehicular component to be tested by introducing at least an acceleration signal and a clutch signal from the measurement controlling section and the simulation model from the model generating section and outputs control signals to the inverter and the electronic control section so as to control the vehicular component to be tested.

2. A testing system for an automotive vehicular component as claimed in claim 1, wherein the system monitor section is further arranged to execute modifications of a structure of the simulation model and required items including parameters in the simulation model in the model generating section utilizing a Graphical User Interface.

3. A testing system for an automotive vehicular component as claimed in claim 1, wherein the vehicular component to be tested is an engine of the vehicle and the simulation model comprises a transmission simulation model and wherein the electronic controlling section comprises an engine controller, a transmission controller, and a diagnosis input/output section, the engine controller receiving a coolant temperature signal, a throttle position signal, and an electronic fuel injection signal from the engine and the transmission controller executing an input and output of signals from and to the transmission simulation model.

4. A testing system for an automotive vehicular component as claimed in claim 1, wherein the vehicular model execution controlling section comprises: a model unit in which a vibration system dynamic characteristic of a torque transmission system of the vehicle is modeled and is set; and a resonance suppression control section to execute a resonance vibration suppression control for the torque transmission system.

5. A testing system for an automotive vehicular component as claimed in claim 4, wherein a resonance point of a resonant frequency of the testing system is set to a frequency placed in a vicinity to 100 Hz and the resonance suppression control executed in the resonance suppression control section of the vehicle model execution controller is based on the set resonance point frequency.

6. A testing system for an automotive vehicular component as claimed in claim 1, wherein the vehicular component to be tested is an engine and the servo driver comprises an opening angle controlling section that is provided with a learning function on an actual vehicular driving mode and outputs a stroke opening angle correction value corresponding to a vehicle speed command value from the measurement controlling section when the vehicle speed command value is inputted therein from the measurement controlling section; an engine characteristic memory section that previously stores an engine output characteristic and outputs a required opening angle predicted value on the basis of the vehicle speed command value and the stroke opening angle correction value; an engine-and-vehicle-speed conversion section that detects a revolution speed of the engine and outputs an opening angle amendment value which is a deviation value between the detected revolution speed of the engine to be tested and the vehicle speed command value; and a speed limit section that adds the required opening angle predicted value to the opening angle amendment value to provide an added result value and sets a speed limit value by introducing the vehicle speed command value and the added result value to the opening angle controlling section section.

7. A testing system for an automotive vehicular component as claimed in claim 1, further comprising serial communication devices interposed between the controller and the inverter to provide signal transmission and receipt thereof between the controller and the inverter.

8. A testing method for an automotive vehicular component, comprising:
   providing a dynamometer linked to the vehicular component to be tested via a torque meter and a rotary shaft, the dynamometer being controlled by means of an inverter;
   providing a servo driver;
   providing an electronic controlling section, the vehicular component to be tested being controlled by outputs of the servo driver and electronic controlling section;
   setting required items including a vehicular specification and a running resistance of the vehicle, monitoring with a system monitor;

outputting required items including the vehicular specification and the running resistance to a measurement controlling section;

providing a model generating section connected to the system monitor section via a transmission path and in which a simulation model including a vehicular vertical vibration model constituted by a vehicular suspension spring and a tire spring and a spring model of an inertia system is set;

executing a vehicular model simulation for the vehicular component to be tested by introducing at least an acceleration signal and a clutch signal from the measurement controlling section and the simulation model from the model generating section; and outputting control signals to the inverter and the electronic control section so as to control the vehicular component to be tested.

* * * * *